United States Patent [19]

Hazumi et al.

[11] 4,079,307
[45] Mar. 14, 1978

[54] ALTERNATING CURRENT GENERATING DEVICE

[75] Inventors: Kenji Hazumi; Tsutomu Tanaka, both of Tokyo; Katsutoshi Tagami, Asaka, all of Japan

[73] Assignees: Sawafuji Electric Co. Ltd.; Honda Giken Kogyo Kabushiki Kaisha, both of Tokyo, Japan

[21] Appl. No.: 736,456

[22] Filed: Oct. 28, 1976

[30] Foreign Application Priority Data

Nov. 8, 1975  Japan .................................. 50-134395
Nov. 8, 1975  Japan .................................. 50-134396

[51] Int. Cl.² .......................... H02P 9/14; H02M 5/00
[52] U.S. Cl. .......................................... 322/61; 322/32; 322/47; 363/102; 363/174

[58] Field of Search ...................... 322/28, 29, 32, 59, 322/61, 62, 87, 47; 363/102, 174

[56] References Cited

U.S. PATENT DOCUMENTS 3,070,740  12/1962  Chirgwin et al. ............... 322/61 X
3,663,945  5/1972  Hughes et al. ................. 322/61 UX Primary Examiner—Robert J. Hickey

[57] ABSTRACT

An inductor-type high frequency generator with alternating current field excitation and frequency changing output means. An excitation winding provides current for the field winding by way of a rectifier, and automatic voltage regulator and an inverter. In response to generator output the A.V.R. controls the d.c. voltage fed to the inverter.

7 Claims, 2 Drawing Figures

ALTERNATING CURRENT GENERATING DEVICE

BACKGROUND OF THE INVENTION

1. Field of the Invention

This invention relates generally to an alternating current generating device, and more specifically to an alternating current generating device of alternating current excitation type using an inductor-type high frequency generator for obtaining high output of low frequency, wherein circuits of simple configuration are provided to reduce the regulation of the voltage applied to the load.

2. Description of the Prior Art

The number of revolutions N of an ordinary AC generating device is generally expressed by the following equation.

$$N = 120 \, f/p \text{ (r.p.m.)} \quad (1)$$

where $f$ is a frequency and $p$ is the number of magnetic poles. In order to obtain a low frequency output of, for example, 50 Hz, the number of revolution $N$ is limited to 3,000 rpm even when the number of magnetic poles $p$ is set to 2 poles. For this reason, in designing a small-sized engine generator, there has been a limitation which make it impossible to increase the number of revolution to obtain high output.

To solve this problem, an AC generating device has been developed in which an inductor-type high frequency generator supplied with an AC field current of, for example, 50 Hz is revolved at high speed, and the resultant high frequency output is rectified and converted to a high output of a required frequency, for example, 50 Hz. In this type of AC generating device, however, the voltage regulation to a load is high, as often seen in conventional inductor-type high frequency generator, particularly a severe voltage regulation is observed when applied to a light load. To cope with this, there has been devised an automatic voltage regulating circuit provided at the output stage of the generating device. In this case, however, the current capacity of the automatic voltage regulating circuit tends to be too large. For this reason, there has been devised an AC generating device in which the field current is regulated in accordance with the voltage applied to the load. However, since an AC exciting type AC generator having a field current of sine wave is usually employed in such a device, the configuration of a control circuit for controlling the sine wave current at a predetermined level, or the above-mentioned automatic voltage regulating circuit becomes complicated. In addition, it is difficult to obtain a proper sine waveform.

SUMMARY OF THE INVENTION

An object of this invention is to provide an alternating current generating device which solves the above-mentioned problems.

Another object of this invention is to provide an alternating current generating device in which a DC controlling type automatic voltage regulating means having a relatively simple circuit configuration and an inverter circuit for converting the DC output voltage of the automatic voltage regulating means to a sine wave voltage of a predetermined low frequency are provided to perform voltage regulation.

A further object of this invention is to provide an alternating current generating device in which hunting, which often occurs due to the difference between the response speed of the automatic voltage regulating means and the response speed of the field winding connected to the output side of the inverter circuit, is prevented by providing in the automatic voltage regulating means a time constant circuit in which the output is negatively fed back to the input side of the automatic voltage regulating means to cause the response speeds of the two to coincide with each other.

DETAILED DESCRIPTION OF PREFERRED EMBODIMENTS

Figure 1:
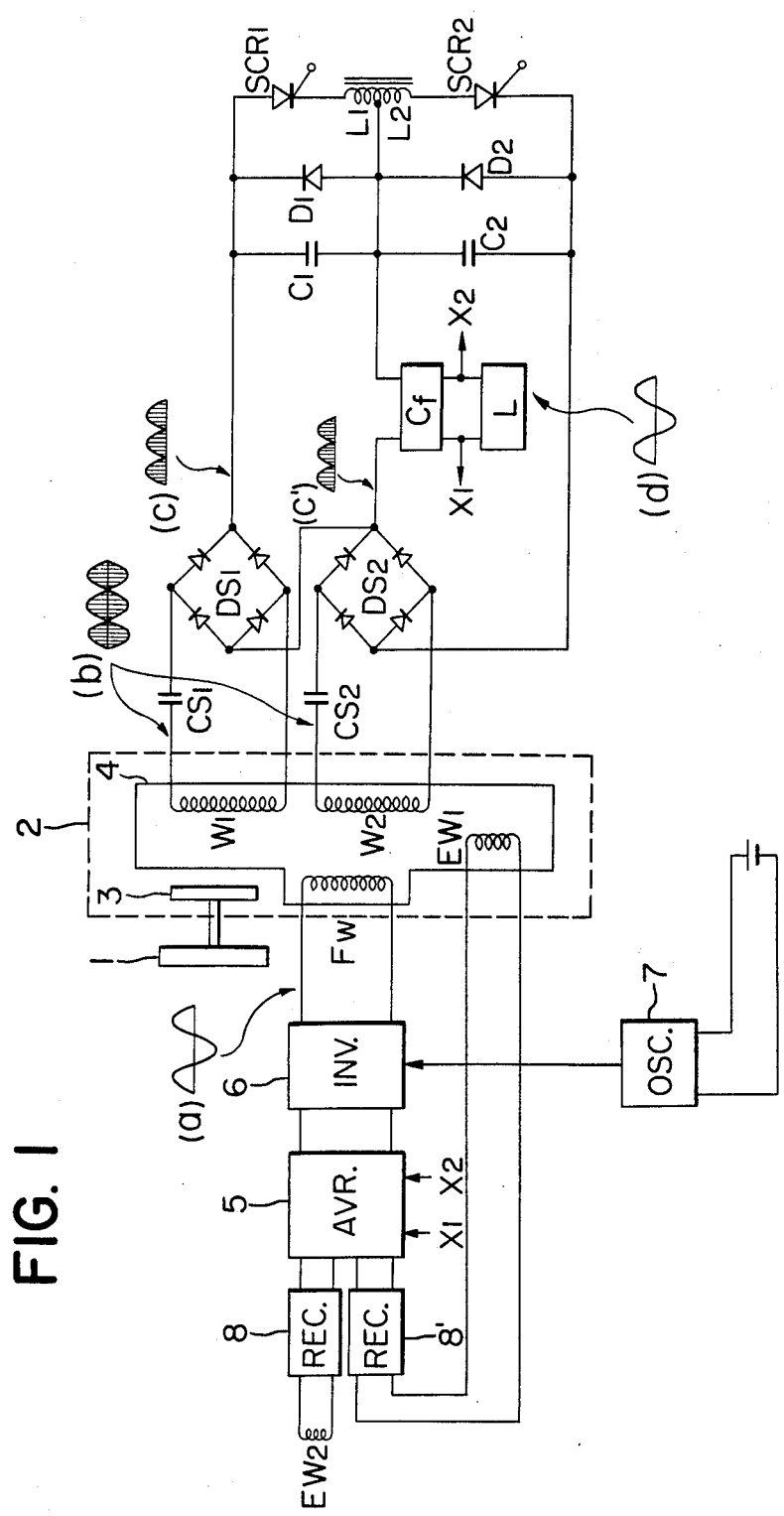
FIG. 1 is a block diagram of an alternating current generating device embodying this invention.

In FIG. 1, numeral 1 refers to an engine, 2 to a high frequency generator having an inductor 3 and a stator 4 on which a field winding FW for supplying the inductor 3 with an AC exciting current and windings W1, W2, EW1 are wound, 5 to a DC controlling type automatic voltage regulating means (AVR) for controlling the output voltage in accordance with the voltage across the terminals X1 and X2 of a load L, 6 to an inverter circuit for converting the DC output voltage of the automatic voltage regulating means 5 to a sine wave voltage of low frequency, such as 50 Hz or 60 Hz to supply to the field winding FW, 7 to a low frequency oscillator for determining the frequency of the above-mentioned low frequency sine wave voltage, 8 and 8' to rectifier circuits for rectifying the AC voltage induced in a starting exciter winding EW2 or an excitation generating winding EW1 into a DC voltage to supply to the automatic voltage means 5. EW1 is an excitation generating winding, EW2 is a exciter winding for starting the high frequency generator 2, W1 and W2 are output windings, FW is a field winding, CS1 and CS2 are series capacitors for nullifying the inductive reactance of output windings W1 and W2, DS1 and DS2 are diode stacks for full-wave rectifying the high frequency output of the output windings W1 and W2, SCR1 and SCR2 are silicon controlled rectifiers, C1, C2, D1, D2 and L1, L2 are capacitors, diodes and transformer windings, respectively, constituting a commutating circuit for silicon controlled rectifiers SCR1 and SCR2, Cf is a filter comprising capacitors, etc. for smoothing the ripple content of the high frequency output to supply to a load L.

An AC field current of a predetermined frequency, as shown in (a) in the figure, which is determined by the oscillation frequency of the low frequency oscillator 7 is supplied to the field winding FW of the high frequency generator 2. In this state, when the inductor 3 is rotated by the engine 1, a high frequency voltage amplitude modulated with a voltage of a predetermined low frequency, as shown in (b) in the figure, are induced in each of the output windings W1 and W2. In this case, the high frequency component of these induced voltages is determined by the number of teeth and the number of revolution of the inductor 3. The voltages as shown in (b) in the figure are full-wave rectified into waveforms shown in (c) and (c') by diode stacks DS1 and DS2. These rectified outputs (c) and (c') are alternately connected to the load L by the silicon controlled rectifiers SCR1 and SCR2 which are alternately gated in synchronism with the period of the low frequency rectified output. In other words, when one silicon controlled rectifier SCR2 is triggered while the other silicon controlled rectifier SCR1 is conducting, the SCR1 is turned off by the reverse voltage induced in one winding L1 of the commutating transformer by the current flowing in the other winding L2. In the other way around, SCR2 is similarly turned off. Thus, an AC load current of low frequency, as shown in (d) in the figure, is fed to the load L. The circuit configuration and operation of the automatic voltage regulating means 5 and the inverter circuit 6 will be described in the following, referring to FIG. 2.

Figure 2:
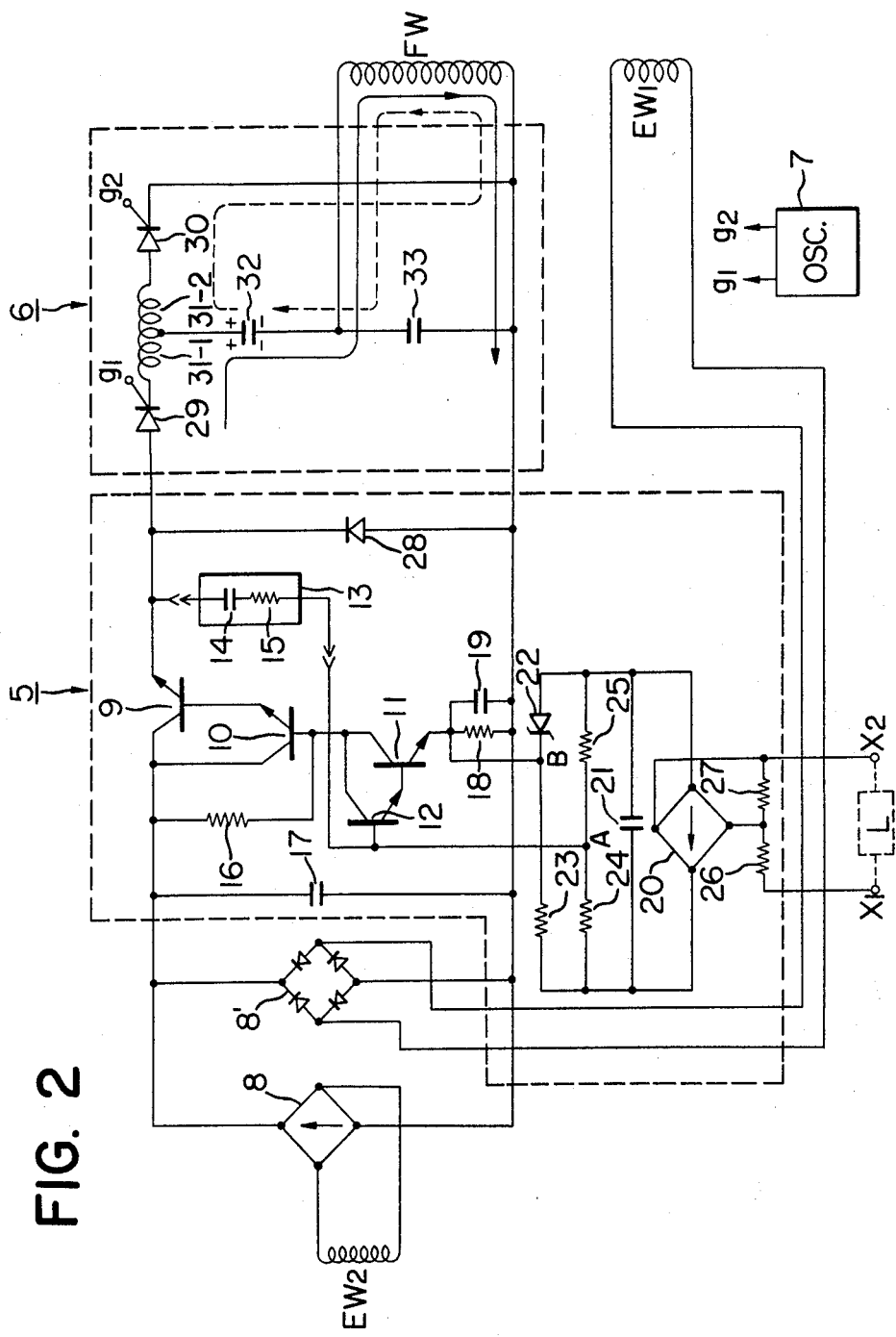
FIG. 2 is a circuit diagram of a major part of FIG. 1.

In FIG. 2, L, FW, EW1, EW2, 5, 6, 7, 8, 8' correspond with like numerals and alphabetical symbols given in FIG. 1. Numeral 9 refer to a controlling transistor Darlington-connected to a transistor 10 for controlling the DC supply voltage to the inverter circuit 6. Numeral 11 refers to a detecting transistor Darlington-connected to a transistor 12 for controlling the base current of the controlling transistor 9 and the transistor 10. Numeral 13 refers to a time-constant circuit, to be provided as necessary, comprising a capacitor 14 and a resistor 15, whose time constant is selected so as to coincide with the time constant of the load side circuit, viewed from the inverter circuit 6, which is determined mainly by the field winding FW. Numeral 16 refers to a base resistor for supplying base current to the transistor 10 Darlington-connected to the controlling transistor 9, 17 is a capacitor for smoothing the rectified output of the rectifier circuit 8 or 8', 18 is a resistor connected to the emitter of the detecting transistor 11, 19 is a capacitor connected in parallel with the resistor 18, 20 is a rectifier circuit for full-wave rectifying the low frequency voltage applied across the terminals X1 and X2 of the load L, 21 is a capacitor for smoothing the rectified output of the rectifier circuit 20, 22 is a Zener diode constituting a bridge circuit, together with resistors 23, 24, 25 for controlling the collector current of the detecting transistor 11 by detecting the terminal voltage of the load L, 26 and 27 are resistors, 28 is a diode. 29 and 30 are silicon controlled rectifiers (SCRs) whose gates g1 and g2 are alternately triggered by signals of a predetermined low frequency produced by a low frequency oscillator 7, 31-1 and 31-2 are commutating transformer windings, 32 and 33 are capacitors.

Assuming the generator 2 (FIG. 1) generates a high frequency output and a low frequency sine wave voltage as shown in (d) in FIG. 1 is applied to the load L (FIG. 1), a high frequency voltage is induced in the excitation generating winding EW1, as in the output windings W1 and W2, and the high frequency voltage is full-wave rectified by the rectifier circuit 8' and supplied to the automatic voltage regulating means 5.

In the meantime, the terminal voltage of the load L is fed to the automatic voltage regulating means 5 as an input, and the terminal voltage is full-wave rectified by the rectifier circuit 20 via the resistors 26 and 27 and fed to the bridge circuit which consists of the Zener diode 22, the resistors 23, 24, 25 and produces an output voltage (the potential difference across the terminals A and B in the figure). The above-mentioned bridge circuit conduction controls the detecting transistor 11 and the transistor 12 Darlington-connected with the transistor 11 based on the state where the terminal voltage of the load L is at a predetermined level. The controlling transistor 9 is in conducting state because a base current is fed via the resistor 16 to the transistor 10 Darlington-connected with the controlling transistor 9.

Therefore, the rectified output fed as an input from the rectifier circuit 8' to the automatic voltage regulating means 5 is supplied via the controlling transistor 9 to the inverter circuit 6.

The case where the circuit shown in FIG. 2 is constructed without the time constant circuit 13 will be first described. Assuming the terminal voltage of the load L exceeds a predetermined level, the output voltage of the bridge circuit is increased, and accordingly the base-emitter voltage of the Darlington circuit consisting of the detecting transistor 11 and the transistor 12 is increased, and thereby the collector current of the detecting transistor 11 is increased. This causes the base current to the transistor 10 Darlington-connected with the controlling transistor 9 and the collector current to the controlling transistor 9 to decrease. That is, as the terminal voltage of the load L increases above the predetermined level, the collector current of the controlling transistor 9 decreases, the voltage supplied to the inverter circuit 6 decreases, and the exciting current to the field winding FW decreases. Thereby, the level value of the voltage produced in the output windings W1 and W2 (FIG. 1) decreases and the voltage applied to the load L (FIG. 1) also decreases. On the other hand, when the terminal voltage of the load L drops below the predetermined level, the collector current of the controlling transistor 9 increases, the voltage fed to the inverter circuit 6 increases and the exciting current to the field winding FW increases. This causes the level value of the voltage produced in the output windings W1 and W2 (FIG. 1) and the voltage applied to the load L (FIG. 1) to increase. In this way, when the terminal voltage of the load L increases, the exciting current to the field winding FW and the voltage applied to the load L are decreased. On the other hand, when the terminal voltage of the load L decreases, the exciting current to the field winding FW and the voltage applied to the load L are increased. Thus, the voltage applied to the load L is kept at an almost constant level.

However, there is much room for further improvement in an alternating current generating device having an automatic voltage regulating means 5 without such a time constant circuit 13, which will be described later. While the response speed of the automatic voltage regulating means 5 to the voltage variations of the load L is high, the field current of the field winding FW has a larger time delay than the output voltage of the automatic voltage regulating means 5 due to the time constant of the field winding FW, which is connected to the output side of the inverter circuit 6 and has a relatively high inductance. In other words, there is a relatively large difference between the response speed of the automatic voltage regulating means 5 and the response speed of the load side circuit of the inverter circuit 6 to variations of the terminal voltage of the load L as described above. Consequently, the voltage applied to the load L may not be kept at a desired level due to hunting.

To solve this problem, a time constant circuit 13 is provided as necessary in this invention between the emitter of the controlling transistor 9 and the base of the transistor 12 so as to cause the response speed of the automatic voltage regulating means 5 to delay to coincide with the response speed of the load side circuit of the inverter circuit 6 through the negative feedback of the output of the controlling transistor 9 to the input stage. The operation of the automatic voltage regulating means having the time constant circuit 13 will be described in the following.

As the terminal voltage of the load L increases and the potential difference across the terminals A and B in the figure also increases, the collector current of the detecting transistor 11 increases while the collector current of the controlling transistor 9 decreases. This causes the emitter potential of the controlling transistor 9 to decrease, then causing the base potential of the transistor 12 to decrease via the time constant circuit 13. As a result, the increase rate of the collector current of the detecting transistor 11 is reduced to a relatively moderate one. In other words, the decrease of the collector current of the controlling transistor 9 following the increase of the terminal voltage of the load L is completed with a delay of the time constant of the time constant circuit 13, that is, the response speed of the automatic voltage regulating means 5 is delayed.

The circuit operation of the inverter circuit 6 will be described in the following. When an SCR 29 is in conducting state and other SCR 30 is in non-conducting state, a current flows in the direction shown by a solid line arrow in the figure. In the state above, when the gate g2 of the SCR 30 is triggered to turn off the SCR 29 and to turn on the SCR 30, the capacitor 32, which has been charged in the polarity shown in the above-mentioned state, starts to discharge, feeding the field current flowing in the direction shown by a broken line arrow in the figure to the field winding FW. Then, gate signals are alternately fed to the gate g1 of the SCR 29 and the gate g2 of the SCR 30, and an AC field current of sine wave is fed to the field winding FW.

As described above, this invention makes it possible to maintain the voltage across the load L at a constant level by controlling the AC exciting current to the field winding FW in accordance with the voltage across the load L. This invention makes it possible to easily control the AC exciting current to the field winding FW with a simple circit configuration since the above-mentioned control is performed by the use of the DC-controlling type automatic voltage regulating means 5 after the AC output from the excitation generating winding EW1 is converted to DC. This means that wave form distortion in the AC field current caused by the use of the automatic voltage regulating means 5 does not have to be taken into consideration.

This invention makes it possible to prevent hunting and to maintain the voltage applied to the load at an almost constant level since a time constant circuit 13 is provided as necessary in the automatic voltage regulating means 5 to cause the response speed of the automatic voltage regulating means 5 to delay so as to coincide with the response speed of the load side circuit of the inverter circuit 6.

What is claimed is:

1. An alternating current generating device comprising a high frequency generator having an output winding, a field winding and an excitation generating winding for supplying a field current to the field winding; a rectifying means for rectifying the output of the output winding; a conduction control means for time-selectively and alternately coupling the output of the rectifying means to the load in alternating polarities; an automatic voltage regulating means provided between the field winding and the excitation generating winding for controlling the output voltage in accordance with the voltage across the load, and an inverter circuit for converting the output voltage of the automatic voltage regulating means to a sine wave output of a predetermined frequency to supply the field current to the field winding, the automatic voltage regulating means the supplied DC voltage to supply to the inverter circuit.

2. An alternating current generating device as set forth in claim 1 wherein the automatic voltage regulating means regulates the DC voltage obtained by rectifying the voltage induced in the excitation generating winding to supply to the inverter circuit.

3. An alternating current generating device as set forth in claim 1 wherein the automatic voltage regulating means comprises a detecting transistor for detecting the voltage across the load, and a controlling transistor the controlling portion of which is controlled by the detecting transitor and which controls the DC supply voltage to the inverter circuit.

4. An alternating current generating device as set forth in claim 1 wherein the automatic voltage regulating means has a time constant circuit which is constructed so as to cause the response speed of the automatic voltage regulating means to coincide with the response speed of the load side circuit connecting to the output side of the automatic voltage regulating means, by delaying the response speed of the automatic voltage regulating means.

5. An alternating current generating means as set forth in claim 4 wherein the automatic voltage regulating means regulates the DC voltage obtained by rectifying the voltage induced in the excitation generating winding to supply to the inverter circuit.

6. An alternating current generating device as set forth in claim 4 wherein the automatic voltage regulating means comprises a detecting transistor for detecting the voltage across the load, and a controlling transistor the controlling portion of which is controlled by the detecting transistor and which controls the DC supply voltage to the inverter circuit.

7. An alternating current generating device as set forth in claim 4 wherein the time constant circuit is connected between the output portion of the controlling transistor and the controlling portion of the detecting transistor.

* * * * *